April 17, 1945.　　　W. M. EMERY　　　2,373,668
MOTOR
Filed April 19, 1943　　2 Sheets-Sheet 1
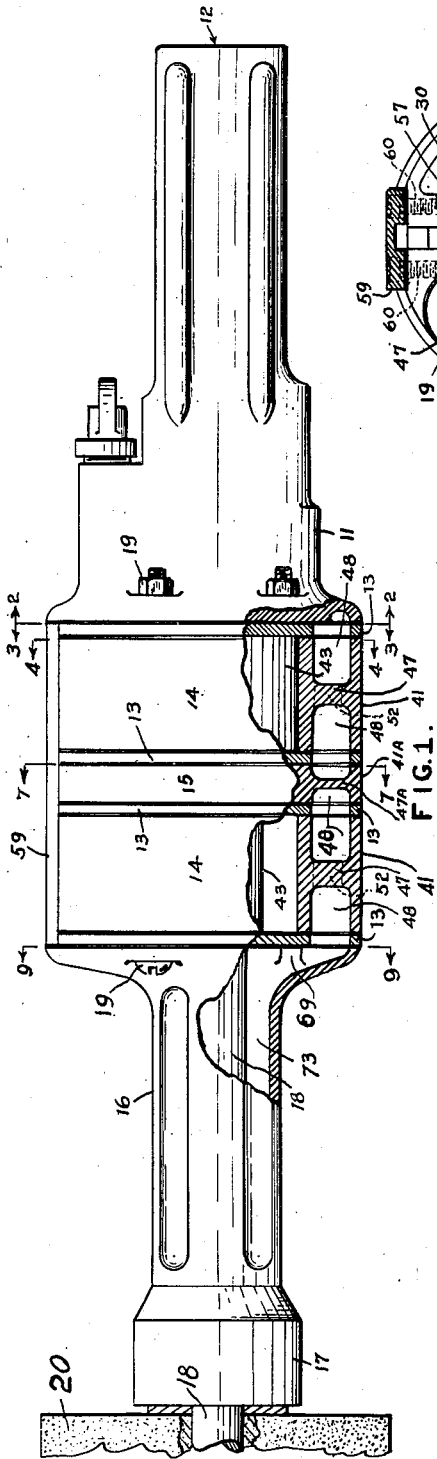
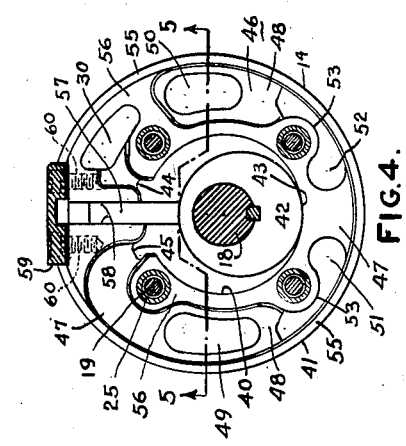
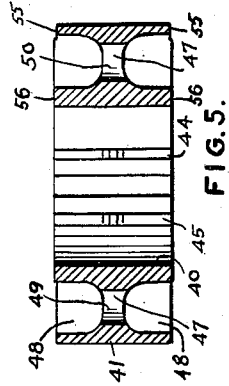
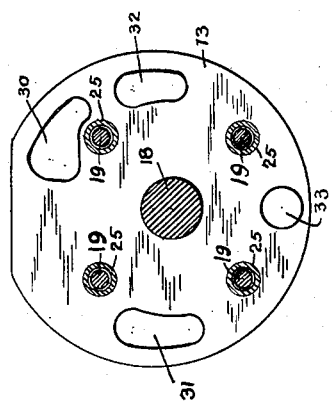
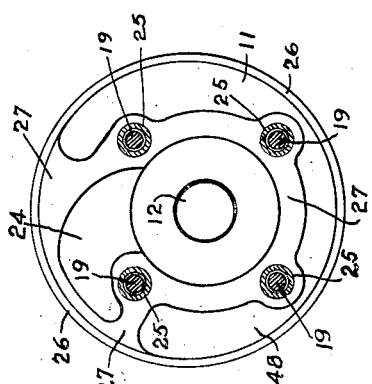
INVENTOR.
William M. Emery
BY April 17, 1945. W. M. EMERY 2,373,668
MOTOR
Filed April 19, 1943 2 Sheets-Sheet 2

INVENTOR.
William M Emery
BY

Patented Apr. 17, 1945

2,373,668

UNITED STATES PATENT OFFICE 2,373,668

MOTOR

William M. Emery, Shaker Heights, Ohio, assignor to The Rotor Tool Company, a corporation of Ohio Application April 19, 1943, Serial No. 483,598

6 Claims. (Cl. 121—34)

My invention relates to novel structure which affords strikingly different means of emitting the exhaust air from portable pneumatic tools and other exhausts with associated structure therefor.

The exhaust from portable pneumatic tools has always been considered a necessary evil. If the exhaust is concentrated on the top of the tool it blows in the face of the operator. When it is located on one side of the tool it either blows at the operator or away from him, frequently at his fellow workman. In this latter case if a wheel guard is used with such a pneumatic grinder, the operator could not shift the machine from one hand to the other without indexing the wheel guard 180 degrees or else the exhaust would blow at him. If the exhaust points down it blows its chill volume on the feet and legs of the operator and constantly stirs up the floor dust of which there is so much in a grinding room. This dangerously increases the dust inhaled by the operators as well as spreading the abrasive dust over the machinery in other parts of the plant. In an impotent effort to overcome this, adjustable exhaust deflectors have been used but, as I have indicated, while one position may be less desirable than another, the exhaust concentrated in any direction is very objectionable, so that in the past the blow of the exhaust as well as its noise has been considered an inherent characteristic of pneumatic tools which had to be endured.

It is not only the blow of 25 to 100 or more cubic feet of air per minute at a pressure of about 20 to 60 pounds per square inch as it leaves the tool that is objectionable, but also—

1. This air is extremely cold, usually about freezing.

2. It is laden with atomized oil.

3. The noise is often a loud pulsating screech which is distressing both to the immediate operators in the shop and to all workers in neighboring offices who are often more distracted thereby than the operators who seem to more quickly accustom themselves to it.

As I will hereafterward show my invention overcomes all these objections and, in fact, the result of my invention is an egress means which is so general that it is difficult without close examination to discover where exhaust air should leave the tool. It would almost seem that I had developed an air tool without an exhaust because it is so completely hidden.

While any modifying chamber subsequent to the primary exhaust might be expected to reduce the efficiency of the motor this does not seem to occur with my invention because of a novel concatenation of structure and for the following reasons:

1. The final porting although finely dispersed has a surprisingly large effective area.

2. The initial exhaust port as well as the final inlet port to the motor, especially the former, is of novel design which increases the efficiency of the motor by more directly associating the cylinder bore with the modifying chamber.

There are basically two types of air motors in general use today for portable pneumatic tools. One is the internal vane type, where a plurality (usually four) vanes, blades, or abutments are slidably mounted in deep grooves longitudinally disposed in a rotor which is eccentrically positioned in a cylinder with one point of its circumferential wall in practical contact with the cylinder bore. The vanes are pressed against the cylinder wall by live air and/or centrifugal force. An inlet port is positioned adjacent to one side of the line of practical contact between the rotor and the bore and the exhaust port is usually 120° to 180° from the inlet port. The vanes, therefore, divide the crescent chamber between the rotor and the cylinder bore into a plurality of chambers which increase the decrease in cubic volume as the rotor revolves. The point of maximum exhaust occurs when each vane passes the exhaust port and the air at a pressure of 20 to 60 pounds per square inch in each segmental chamber is suddenly released through the exhaust. This type motor inherently provides the least objectionable exhaust because the plurality of vanes usually divides the exhaust into four or five lesser pulsations per revolution and the air exhausts at a lower pressure, due to the fact that some expansion takes place between the time one vane passes the inlet and before the preceding vane passes the exhaust.

The other type of air motor in current use is the one shown in my embodiment. It is known as an external blade or abutment type motor because a single blade, vane or abutment is mounted for reciprocating movement in a cylinder wall to contact with an eccentric rotor which revolves on a shaft concentric with the cylinder bore with a land on the rotor in practical contact with the wall of the bore. An inlet and an exhaust port enter the bore on opposite sides and adjacent to the reciprocating abutment.

To make the motor self-starting it is customary to have two distinct air motors mounted in parallel or tandem to a common shaft with the eccentricities of the rotors indexed 180° relative to each other. Such a motor provides more power per pound of weight and greater simplicity of maintenance, but, because each cylinder or motor cell exhausts only once per revolution and because practically relatively little expansion takes place, the air is exhausted more suddenly and at a greater pressure.

I have here deliberately applied my invention in the embodiment shown herein to this type motor which offers the greater exhaust difficulty, although it obviously may be adapted to the internal vane motor with beneficial result. I do not limit my invention for use with two cylinder motors, but it applies equally well to motors with more than two cylinders and has certain virtues for even single cylinder motors. So that while I especially direct this invention to external abutment motors with a plurality of motor cells acting in parallel, I do not limit its application to such a tool, except as my claims are specifically so limited.

While the perceptible distance that air travels is, of course, in part dependent upon its force, speed or pressure, as well as its volume, it is primarily dependent upon the distance of travel necessary before it can entrain a sufficient mass of atmospheric air to reduce its speed or diffuse its momentum to a point where it is practically not noticeable. The theory is that the momentum of the exhaust air is constant but that the addition of the mass of entrained atmospheric air is such as to reduce its speed until it is imperceptible or unnoticed by the average person.

One embodiment of my invention reduces the speed of the air very quickly for two reasons; first, because the air is emitted in such a thin plane, for example .010 of an inch, that it entrains a sufficient mass of air in a very short distance to reduce its speed to practically nothing and, secondly, since the air is emitted radially, that it diverges or fans out from a cylindrical plane, its force would vary inversely as the square of the distance from the center of the emitting arc of the cylindrical plane even disregarding the entraining of atmosphere just described. The combination of these two factors result in a surprisingly rapid dissipation of exhaust air, and at the same time practically limits the throwing of oil and reduces exhaust noise to a minimum.

With reference to sound reduction these same things appear to be also beneficial. For example, since sound decreases by contact with absorbing surfaces and also because it decreases as it passes through air chiefly by the increasing of the arc or area of its distribution there would be a decided advance in the art in immediately distributing the sound over as complete a circle as possible instead of concentrating the exhaust on one side of the tool. This is especially effective at distances such as in neighboring offices. This is possibly in part typified by comparing the distance which the voice carries when emitted through a megaphone, as compared with its more rapid diffusement when the direction of the sound waves are not so concentrated. Also it would appear that since sound waves are a transverse vibration as compared with light which is a rectilinear vibration that by emitting the sound through a very narrow slot or slots the transverse dimension of the vibration might be cut off or restricted especially if the slots were sufficiently spaced as to preclude the reforming of the decimated sound waves thereafter as might occur if the narrow slots or openings were very close together, such as in a fine wire screen.

One of the factors contributing materially to the efficient muffling effect produced in this embodiment is the generously proportioned and subchambered intermediate expansion chamber wherein the pulsating of the air coming from the motor is minimized and the air is allowed to further expand so that it enters the atmosphere at a materially more constant and lesser pressure. The area of the opening from the chamber into the atmosphere is greater than the area opening into the chamber from the motor.

Objects of my invention are to provide for the types of tools described and other devices having exhausts:

1. A more general and less concentrated exhaust.

2. A less noticeable exhaust and an exhaust one dimension of which is so small that it is difficult for foreign bodies to enter therein which might be detrimental to the motor.

3. A more constant and less pulsating exhaust.

4. The emitting of air from a motor which so quickly disperses the air and blends it with the atmosphere so that its "blow" is practically eliminated a short distance from the tool.

5. The minimizing of the pulsations of the exhaust, the changing of the sound pitch of the exhaust making it less objectionable and the material reduction in sound volume by muffling the exhaust.

6. The eliminating of oil spraying from the exhaust by minimizing the exhaust concentration and force.

7. The muffling of an air tool with a minimum back pressure and to improve the porting of the tool to compensate for any reduction of power incident to the muffling.

8. A different method of porting the motor to afford greater efficiency and an area of porting better distributed over the length of the rotor, without blind spots and also concentrating the porting into a lesser circumferential distance.

9. A rugged though extensively perforated exhaust exterior.

10. A plurality of subdivided air cells to form expansion chambers to muffle the exhaust about the motor and to condense the oil vapor from the exhaust air.

11. Separated and interwebbed circumferential walls to strengthen and stiffen the split ring of an abutment type cylinder to better maintain the width of the split and the trueness of its bore.

12. Laminated sound modulating exhaust means, each lamination thereof being integral with a corresponding motor or handle part in the same plane as the lamination.

13. An ample final exhaust port area of novel proportions so slight in width as to be previously unheard of, and of hitherto unthought of total length, many times greater than the longest dimension of the tool.

14. Means to improve working conditions in a grinding room by not constantly rechurning the previously deposited dust again into the atmosphere, to the injury and detriment of the lungs, eyes, hair and clothing of the workman and also by preventing cold exhaust drafts from being blown intermittently on them by their fellows, and also by muffling the sound of the exhaust and by not spreading dust unnecessarily to other departments and machinery.

15. Means to utilize and provide space about the drive shaft and inside the surrounding handle for an exhaust expansion chamber to aid in eliminating the normal pulsations of the exhaust before the exhaust air is returned to the atmosphere.

Further objects and novel features will be apparent from the following specification and claims when considered together with the accompanying drawings in which:

Fig. 1 is a view in elevation of an embodiment of my invention, with the motor section partially broken away.

Fig. 2 is a sectional view substantially as indicated by line 2—2 on Fig. 1.

Fig. 3 is a sectional view substantially as indicated by line 3—3 on Fig. 1.

Fig. 4 is a sectional view substantially as indicated by line 4—4 on Fig. 1.

Fig. 5 is a sectional view substantially as indicated by line 5—5 on Fig. 4.

Figure 7:
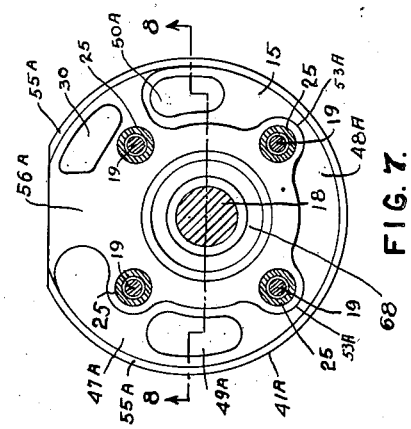
Fig. 7 is a sectional view substantially as indicated by line 7—7 on Fig. 1.

My invention is not necessarily limited to the embodiments or proportions shown in the drawings or to specific dimensions, sizes or other data or type of tool or device set forth as examples for illustration purposes in the specification, nor should it be in any way limited by the theories or hypothesis set forth to explain its operation although to my best knowledge and belief they are correct.

In Fig. 1 is shown an embodiment of my invention including a live end handle 11 through which compressed or live air enters at 12, an end plate 13, a cylinder 14, a second end plate 13, a center bearing block 15, a third end plate 13, a second cylinder 14, a fourth end plate 13, a wheel end handle 16 with a forward end 17, a shaft 18 that is journaled in bearings located in end 17 and block 15, and four through bolts 19 which clamp parts 11, 13, 14, 15 and 16 together to form a laminated construction. The four end plates 13 and the two cylinders 14 are respectively interchangeable and identical except for position.

To shaft 18 may be attached any suitable work device such as a grind wheel which I show fragmentarily in Fig. 1 as 20, or a polishing, buffing, brushing, drilling, reaming or nut setting work means.

Fig. 2 shows a live air port 12 and a passageway 24, through bolts 19 and four dowel bushings 25, the circular relieved surface 26 is slightly spaced from the surface-ground, contacting air sealing surface 27 to allow for the egress of a thin plane of exhaust air between a relieved surface 26 and the adjacent end plate 13, as will hereinafter be described.

Fig. 3 shows the end plate 13, passageway 30 which lines up with part of the passageway 24 (Fig. 2) to carry the live air, perforations 31, 32 and 33 allow the passage of exhaust air through plate 13 as will hereafter be described. The end plate 13 is surface ground on both sides.

Fig. 4 shows the cylinder 14, with through bolts 19 and dowels 25. The dowels are short tubes which interconnect four sockets in each side of each cylinder 14, with sockets in a mating part such as handle 11 or 16 or center block 15 and pass through one of the end plates 13 to maintain the alignment of the laminated construction when the parts are clamped together with through bolts 19. Eccentric with the outside surface of cylinder 14 is a walled bore 40 which is concentric with the bolt circle of bolts 19 and the shaft 18. An eccentric rotor 42 is keyed to shaft 18 and has a land 43 which has a radius just less than that of bore 40 and of a circumferential width to practically cover inlet port 44 and exhaust port 45 simultaneously. When a plurality of cylinders 14 are used, a rotor 42 in each cylinder is oppositely indexed on shaft 18. Thus when two cylinders are used the rotors 42 are relatively indexed 180° and when three cylinders are used the rotors 42 are indexed 120°.

The inlet port 44 connects with passage 30 and exhaust port 45 connects with an intermediate exhaust chamber 46, which is separated into a plurality of sub expansion chambers 48 by a web 47, and end plates 13. The web 47 which interconnects the walled bore 40 with the outside flange 41 of the cylinder 14 is perforated at 49, 50, 51 and 52 to interconnect the sub expansion chambers to aid in forming the exhaust chamber 46. The web 47 is also perforated by inlet passage 30. The nearest of the two bosses 53 to inside of flange 41 further acts to subdivide each sub expansion chamber 48 in each cylinder into three smaller sub expansion chambers.

Surfaces 55 on each end of the cylinder 14 are slightly relieved below the surface-ground air sealing surface 56 so as to allow the emission of a very thin plane of exhaust air between each side of cylinder 14 and end plates 13.

The advance of the art in extensively subdividing an intermediate exhaust chamber is better appreciated when one considers the very successful and predominating automotive muffler which is typified in the H. H. Schnell Patent 1,811,762 when considered in connection with its file history which includes many tests and much expert testimony. When dealing with air to prevent too sudden equalization and to modify pulsations it is advantageous to inhibit the transmission of variations or surges of pressure by subdividing the chamber into a multitude of cells and by effecting a circuitous path for the air currents tending to effect said equalization. Also there is a material advantage in having a multitude of such cells and auxiliary air paths in the modifying and muffling of sound.

Figure 6:
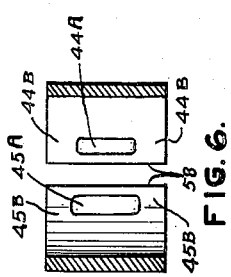
Fig. 6 is a sectional view similar to Fig. 5 but showing the current construction now on the market and well known in the art.

The inlet 44 and the exhaust 45 are cut through the walled bore for the full length of the bore. Web 47 is tapered towards and set back sufficiently from inlet 44 and exhaust 45 not to interfere with the air stream occupying and efficiently passing through the full length of the cut which is also the full length of the rotor 42 so there are no shaded or blind portions in either the inlet or the exhaust. The present standard construction on the market for this type pneumatic motor is shown in Fig. 6. It will be seen that ports 44A and 45A are much limited as to length. The inlet port 44A being only one-half the length of the bore and the exhaust port 45A being less than two-thirds the length. Also the sections 44B and 45B shade a portion of the rotor and cause blind spots. This is especially noticeable when one imagines the rotor 42 rotated about 240 degrees in the direction of rotation which is clockwise as shown in Fig. 4. The full opening of my ports is even more important in the case of the exhaust port wherein sections 45B definitely hinder the free exhaustion of motor.

The I beam structure of my cylinder in my invention consisting of an outer wall or flange 41 and an inner walled bore 40 spaced apart and interconnected by an integral central web materially aids in maintaining the dimensions and the rigidity of my cylinder after the abutment slot is cut.

With motors of the abutment type, it is important that the rotor 43 be as nearly a perfect circle as possible because of the abutment action. Accordingly a shorter land is advantageous. Since the length of the land is primarily determined by the length required to practically cover both ports at the same time to prevent the air from blowing clockwise about the rotor from the inlet 44 to the exhaust port 45 when the rotor is revolved 180° from the position shown in Fig. 4, it is a further advancement in the art when sufficient port areas can be obtained while at the same time a reduction is made in the necessary circumferential length of the land. As shown, my improved porting not only increases the area of port as compared to the structure shown in Fig. 6, but also shortens the necessary land. Had I retained only the port area shown in Fig. 6 I could have reduced the land length about 25% which would result in a smoother and more nearly harmonic motion for the blade, vane or abutment 57. This is in the scope of my present invention.

Abutment 57 is the same horizontal length as the bore 40 and the rotor 42. It is mounted for reciprocating movement in a walled groove or cut 58 which completely cuts the circle of cylinder 14. The walled groove 58 is covered with a cap 59 fastened to each cylinder 14 by four screws 60. Each abutment 57 is pressed into contact with its respective rotor 42 by means of live air pressure. The passage carrying this live air from the live handle to behind the abutment is not shown as it is old in the art and not considered part of my invention.

Figure 8:
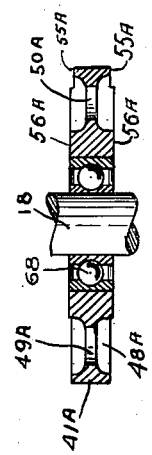
Fig. 8 is a sectional view substantially as indicated by line 8—8 on Fig. 7.

Figs. 7 and 8 show the center bearing block 15, a ball bearing 68 for shaft 18, a web 47A, sub expansion chambers 48A, perforations 49A and 50A, inlet passageway 30, boss 53A, relieved surface 55A, surface ground air sealing surface 56A and outside flange of the center block 41A. These parts designated by the letter "A" have similar functions to the corresponding part already designated by the same numeral but without the letter suffix and shown in Figs. 4 and 5.

It may be said that each cylinder 14, together with two end plates 13, together with the rotor 42, the shaft 18 and abutment 57 and attendant parts form a motor cell. Usually a plurality of cells form an abutment type motor of a pneumatic tool and for this reason I will not repeat the description of the parts for the second cell shown in Fig. 1.

Figure 9:
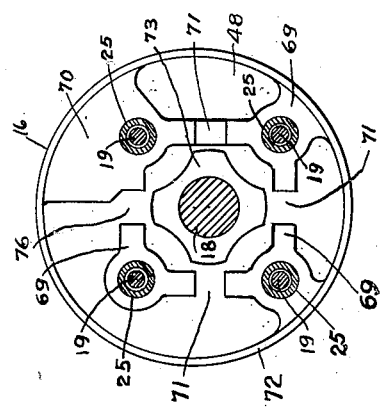
Fig. 9 is a sectional view substantially as indicated by line 9—9 in Fig. 1.

Fig. 9 shows one end of the wheel end handle 16. About the shaft 18 is a walled cavity or confined air space 73 which is the interior of handle 16 and which is especially valuable as an expansion chamber because of its length and capacity. To utilize this space I make it a part of the intermediate general exhaust chamber by means of connecting perforations 31, 32, and 33 in an end plate 14. The air sealing surface 69 presses the adjacent end plate 14 into sealing contact with surface 56 of the cylinder and section 70 of said surface 69, seals and terminates the passageway 30. Exhaust air may pass through breaks 71 in the sealing surface 69 and pass out in a very thin plane between the relieved surface 72 and adjacent ground side of end plate 14.

Figure 10:
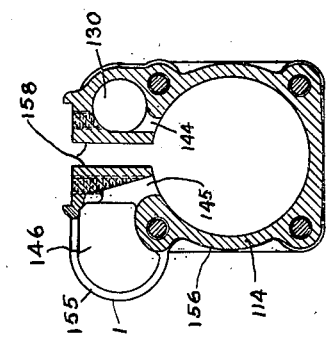
Fig. 10 is a sectional view of another embodiment of my invention.

Fig. 10 shows a cylinder casting 114, an inlet passageway 130, an inlet 144, an exhaust port 145, an intermediate or exhaust chamber 146 and a plurality of parallel and similar exhaust passageways 155, one of which is shown in part. These may be made by milling slots in the bulging wall 141 or by the relief of a surface such as 155 relative to an adjacent surface such as the surface of an end plate like 13. This construction will distribute the exhaust air over a wide angle to more quickly diffuse it into the atmosphere, said angle being substantially increased by the bulging of the wall 141. I do not consider the limited expansion chamber 146 to be equivalent to the larger and subdivided chamber 46 and unless the bulge is large enough to more or less stagnate the air therein it will not as effectively disperse the exhaust air.

Accordingly, it will be observed that I have invented novel egress means to provide for the emission of exhaust air from an intermediate general exhaust chamber into which all motor cells exhaust and in which all exhaust pulsations are blended and in contradistinction to the sharply defined pulsations of the exhausts upon entering the intermediate chamber, the exhaust air finally is returned to the atmosphere practically without pulsation in eight very thin planes probably between .005 to .025 inch in thickness, diverging therefrom radially.

If for example the outside circumference of the cylinders is 12½ inches, of which 9½ inches are operative to emit thin radial streams of exhaust air, then the total length of the egress means for the exhaust air is 76 inches and since the total length of the tool would be about 18 inches it will be seen that my final exhaust is more than four times the longest dimension of the tool and has a most novel shape such as for example .010 inch wide and 76 inches long, or a length 7600 times its width. Yet it would have an ample area such as ¾ of a square inch to allow for the emission of the exhaust with a minimum of back pressure. A final exhaust area of ¾ of a square inch is 3 times the area of the initial exhaust port 45A Fig. 6 now in current use and 2 times the area of exhaust 45 Fig. 4 of my improved novel design. In the past holes have been drilled and slots milled with standard milling cutters to exhaust air but never have such egression ports as I have invented been produced by slightly relieving adjacent surfaces to effect extremely fine radial exhaust streams.

I claim:

1. In a portable pneumatic tool, in combination with a common shaft, eccentric rotors oppositely mounted on a shaft, a cylinder section for each rotor concentric with the shaft, a reciprocating abutment mounted in each cylinder section to contact with each rotor, end plates separating and closing each cylinder section, means to clamp said cylinder sections and end plates tightly together to form a laminated construction combining a plurality of motor units acting alternately, of, an inlet and an exhaust port for each motor unit, and a common intermediate exhaust chamber about said cylinders to receive the alternate exhaust pulsations from each cylinder and to minimize them and means to disperse said exhaust in a plurality of thin planes into the atmosphere, including the slight spacing of the plates and the ends of the cylinder sections at a plurality of locations adjacent to the intermediate exhaust chamber.

2. In a pneumatic motor, in combination with a plurality of stator members having walled bores, an eccentric rotor concentrically mounted therein, abutments mounted for reciprocating motion in a cut through the wall of each of said bores to contact with each rotor, of, an inlet walled passageway and an exhaust walled passageway piercing the wall of said bore on either side of and adjacent to the abutment and providing an opening for each passageway substantially the same length as said blade cut and substantially parallel thereto and center webs disposed in the stators in a plane substantially midway of each stator and rotor to support and space the walls of said inlet and exhaust passageways.

3. In a pneumatic rotary motor, the combination of a walled bore, a walled groove completely cutting the circumferential wall of said bore, an eccentric rotor concentrically mounted in the bore, an abutment reciprocating in said groove and contacting with said rotor, an outer substantially cylindrical wall eccentric with the bore and spaced therefrom and a web interconnecting the walls of said bore and the outer wall thereby providing substantially an I-beam section to better maintain the separation of walled groove and the circularity of the bore.

4. In a portable pneumatic motor having a plurality of adjacent stator sections clamped together, the combination of an air inlet therefor, an air exhaust therefor, walls integral with said plurality of adjacent stator sections defining an intermediate expansion chamber for said exhaust, and means to emit air from said intermediate expansion chamber into the atmosphere including a plurality of narrow openings formed by the relief of adjacent walls integral with said plurality of adjacent stator sections defining said intermediate expansion chamber.

5. In a portable pneumatic tool, the combination of, a motor, a shaft revolved thereby, a hollow handle surrounding said shaft in such a manner as to leave a cavity between said shaft and said handle, open only at one end to form a blind and practically dead air expansion chamber an air inlet passage to the motor, an exhaust passage from the motor carrying pulsating and exhaust air from the motor to the atmosphere, means to connect said exhaust passage and said practically dead air expansion chamber to utilize the cavity volume of the latter to minimize the exhaust pulsations.

6. In a portable rotary pneumatic motor having an eccentrically related rotor and cylinder the combination of a stator wall formed by a plurality of individual adjacent sections defining an enclosure wherein the rotor and cylinder are positioned, an inlet for compressed air into said cylinder and enclosure to act on said rotor, and means to emit and diffuse the air therefrom into the atmosphere after said air has acted to revolve said rotor relative to the cylinder, said means being formed by slightly spacing said individual adjacent sections one from the other.

WILLIAM M. EMERY.